United States Patent
Hong et al.

(10) Patent No.: US 7,709,542 B2
(45) Date of Patent: May 4, 2010

(54) PROTON-EXCHANGE COMPOSITE CONTAINING NANOPARTICLES HAVING OUTER OLIGOMERIC IONOMER, AND METHODS OF FORMING

(75) Inventors: Liang Hong, Singapore (SG); Zhaolin Liu, Singapore (SG); Xinhui Zhang, Singapore (SG); Bing Guo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 308 days.

(21) Appl. No.: 11/728,240

(22) Filed: Mar. 23, 2007

(65) Prior Publication Data

US 2008/0233451 A1 Sep. 25, 2008

(51) Int. Cl.
*H01M 8/10* (2006.01)
(52) U.S. Cl. ............... 521/28; 521/25; 521/29; 521/38; 429/33
(58) Field of Classification Search .......... None
See application file for complete search history.

(56) References Cited

U.S. PATENT DOCUMENTS 6,060,563 A 5/2000 Peiffer et al.
2006/0205832 A1 9/2006 Dean

OTHER PUBLICATIONS

Lin et al. Journal of Power Sources, 168 (2007), 162-166.*
Chaiko et al. Chem. Mater. 17 (2005), 13-19.*
Lee et al. Journal of Applied Polymer Science, 110 (2008), 2337-2344.*
Ladewig, B.P. et al, "Nanocomposite . . . fuel cells", in 5th Int. Membrane Science and Technology Conference, ed. Tech., U.C.f.M. S.a. 2003, paper 115 pp. 1-5 (Sydney NSW, Aus.).
Su, Y.H. et al, "Using silica nanoparticles . . . cell performance", Journal of Power Sources, 2006, vol. 155, pp. 111-117.
Adjemian, K.T. et al, "Silicon Oxide Nafion . . . cell operation at 80-140C", Journal of The Electrochemical Society, 2002, vol. 149 (3), pp. A256-A261.
Liu, Y.L. et al, "Chitosan-silica complex membranes . . . dehydration of Ethanol -water solutions", Biomacromolecules, 2005, vol. 6, pp. 368-373.
Antonucci, P.L. et al, "Investigation of a direct methanol fuel cell . . . electrolyte for high temperature oepration", Solid State Ionics, 1999, vol. 125, pp. 431-437.

(Continued)

*Primary Examiner*—David Wu
*Assistant Examiner*—Vu Nguyen
(74) *Attorney, Agent, or Firm*—Klarquist Sparkman, LLP

(57) ABSTRACT

A proton-exchange composite includes a polymer matrix formed from a proton-exchange polymer and ionomer particles distributed therein. The polymer has side chains with ionic groups. The particles have an average particle size of less than 20 nm and include an oligomeric ionomer that interacts with the polymer and attracts the ionic groups on its side chains. The composite may be formed by a method in which an initiator is bonded to silica particulates. The initiator is used to initiate polymerization of a precursor monomer to form a salt form of the oligomeric ionomer bonded to the silica particulates, which is then reacted with an acid to produce the oligomeric ionomer, thus forming the ionomer particles. The ionomer particles are dispersed in a solution containing a solvent and the polymer dissolved therein. The solvent is removed. The residue is cured to form the composite.

26 Claims, 12 Drawing Sheets

OTHER PUBLICATIONS

Liu, Y.L. et al, "Preparation and thermal properties of epoxy-silica nanocomposites from nanoscale colloidal silica", Polymer, 2003, vol. 44, pp. 5159-5167.

Lu, M.G.Q et al., "The role of Nanotechnology is clean energy . . . transport sector," (PowerPoint presentation), Australia-China Energy Symposium, Sydney, Nov. 5-7, 2006.

Zhang, X. et al, "Proton-Sweeping Role . . . Silica Nanospheres", Mater. Res. Soc. Symp. Proc. San Francisco Apr. 17-21, 2006, vol. 923E, paper 0923-V05-08.

Pei, H. et al, "Embedded polymerization driven asymmetric PEM for direct methanol fuel cells", Journal Of Membrane Science, 2006, vol. 270, No. 1-2, pp. 169-178.

Gan, L. M. et al, "The zwitterion effect in proton exchange membranes . . . bicontinuous microemulsions", Chemical Communications, 2005, vol. 35, pp. 4459-4461.

Fang, J. et al., "Novel Sulfonated Polyimides . . . Ether-2,2'-disulfonic Acid", Macromolecules, 2002, vol. 35, pp. 9022-9028.

Cho, C.G. et al., "Preparation of Poly(phenylene oxide-gstyrenesulfonic acid) . . . Characterization for DMFC Membrane", High Performance Polymers, 2006, vol. 18, pp. 579-591.

Li, Q. et al., "Approaches and Recent Development of Polymer Electrolyte . . . Fuel Cells Operating above 100C", Chem. Mater. 2003, vol. 15, pp. 4896-4915.

Kreuer, K. D., "On the complexity of proton conduction phenomena", Solid State Ionics, 2000, vol. 136-137, pp. 149-160.

Hogarth, W.H.J. et al., "Solid acid membranes for high temperature (>140C) . . . fuel cells", Journal of Power Sources, 2005, vol. 142, pp. 223-237.

Glipa, X. et al., "Investigation of the conduction properties . . . sulfuric acid doped polybenzimidazole", Journal of Materials Chemistry, 1999, vol. 9, pp. 3045-3049.

* cited by examiner

PROTON-EXCHANGE COMPOSITE CONTAINING NANOPARTICLES HAVING OUTER OLIGOMERIC IONOMER, AND METHODS OF FORMING

FIELD OF THE INVENTION

The present invention relates generally to proton-exchange polymeric materials, and more particularly to proton-exchange composite membranes, and methods for forming them.

BACKGROUND OF THE INVENTION

Proton-exchange membranes (PEM) are useful in many applications, including fuel cells such as hydrogen fuel cells ($H_2$—FC) and direct methanol fuel cells (DMFC). A PEM is typically a semipermeable membrane generally made from ionomers that conducts protons but is impermeable to gasses such as oxygen or hydrogen. In a PEM fuel cell (PEMFC), the PEM severs two functions: separating the reactants, and transporting protons across the membrane. A PEM functions as a polymer electrolyte membrane. A common, and commercially available, PEM material is Nafion™, manufactured by DuPont™. A PEM can be primarily characterized by its proton conductivity, methanol permeability, mechanical strength, and chemical stability. The proton conductivity in a PEM can be significantly affected by the water content in the PEM—loss of water can reduce the proton conductivity.

Conventional PEMs have some drawbacks. For example, in a Nafion membrane, water loss becomes significant at temperatures above 80° C. and the permeability of methanol is high. As a result, a Nafion membrane is not suitable for use in $H_2$—FCs at elevated temperatures, due to reduced proton conductivity caused by dehydration; and is not suitable for use in DMFCs, due to extensive permeation of methanol.

It has been reported that Nafion membranes doped with silica nanoparticles can improve their performance. Such composite membranes are reported to exhibit improved swelling behavior, thermal stability and mechanical properties. However, silica nanoparticles tend to aggregate within the membrane and it is difficult to distribute the silica particles uniformly in the membrane. Further, test data shows that the proton conductivity of the composite membrane remains low, even lower than that of pure Nafion membrane at temperatures from 50 to 80° C.

Accordingly, there is a need for proton-exchange composites that have improved properties such as proton-conductivity, thermal stability, and reduced permeability of water and methanol.

SUMMARY OF THE INVENTION

In accordance with a first aspect of the present invention, there is provided a proton-exchange composite. The composite comprises a polymer matrix formed from a proton-exchange polymer and ionomer particles. The proton-exchange polymer has side chains which have ionic groups. The ionomer particles have an average particle size of less than 20 nm and comprise an oligomeric ionomer that interacts with the proton-exchange polymer and attracts the ionic groups on the side chains of the proton-exchange polymer. The ionomer particles are distributed in the matrix. The oligomeric ionomer may have a pendant sulfopropyl group. The oligomeric ionomer may comprise a sulfopropyl acrylate (SPA) repeating unit. The oligomeric ionomer may also comprise an N,N'-methyl-(6-hexylcarbamatoethylmethacrylate) imidazolonium bromide (EMACI) repeating unit. The oligomeric ionomer may comprise less than 11 repeating units. The ionomer particles may comprise a silica core and an oligomeric ionomer bonded to the silica core. The silica core may have a core size of about 7 nm. The ionomer particles may have an average particle size less than 10 nm. The proton-exchange polymer may be a sulfonated perfluoro-polymer (SPFP). The SPFP may comprise fluorinated polyethylene-polypropylene. The composite may comprise from 2 to 6 wt %, such as about 4 wt %, of the ionomer particles. The ionomer particles may be uniformly distributed throughout the polymer matrix. The composite may be in the form of a membrane or resin.

In accordance with another aspect of the present invention, there is provided a method for forming the above composite. The method comprises bonding an initiator to silica particulates; initiating, with the initiator, polymerization of a precursor monomer, to form a salt form of the oligomeric ionomer bonded to the silica particulates; reacting the salt form of the oligomeric ionomer with an acid to produce the oligomeric ionomer bonded to the silica particulates, and thus form the ionomer particles; dispersing the ionomer particles in a solution comprising a solvent and the proton-exchange polymer dissolved therein, to form a mixture; removing the solvent from the mixture, leaving a residue comprising the ionomer particles and the proton-exchange polymer; and curing the residue to form the composite.

The initiator may be a 1,2-dibromoalkyl group. The initiator may be a dibromoethyl group. The bonding of the initiator to the silica particulates may comprise bonding a vinyl group to the silica particulates; and reacting the vinyl group with bromine to form a 1,-2-dibromo-ethyl group bonded to the silica particulates. The vinyl group may be a triethoxyvinylsilane. The precursor monomer may comprise a salt of sulfopropyl acrylate (SPA). The salt of SPA may be SPA-potassium (SPA-K). The precursor monomer may comprise N,N'-methyl-(6-hexylcarbamatoethylmethacrylate) imidazolonium bromide (EMACI). The solvent may comprise water, ethanol, and dimethylformamide. The solution may comprise 5 to 10 wt % of the proton-exchange polymer. The polymerization may comprise atom transfer radical polymerization. The acid may be a sulfuric acid.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

DETAILED DESCRIPTION

Figure 1:
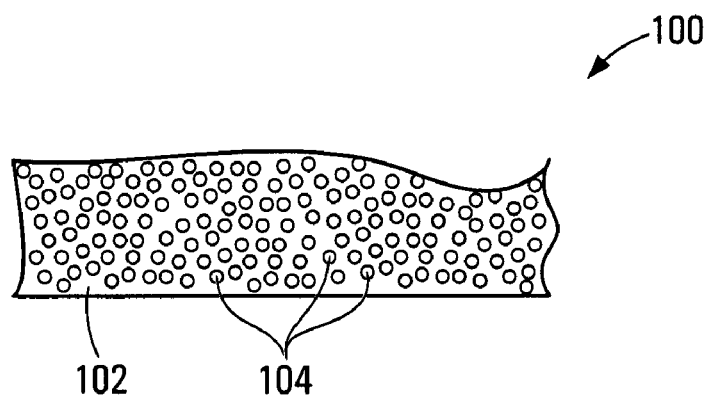
FIG. 1 is a schematic cross-sectional view of a composite membrane having a polymer matrix and ionomer particles distributed therein, exemplary of an embodiment of the present invention.

FIG. 1 illustrates a composite 100, exemplary of an embodiment of the present invention. Composite 100 is a proton-exchange composite, and may be in the form of a membrane or a resin suitable for use in proton-exchange applications, such as fuel cell applications.

Composite 100 includes a polymer matrix 102 formed from a proton-exchange polymer, such as a polymer electrolyte membrane material. A proton-exchange polymer is a polymer that conducts protons or otherwise facilitates the transport of electrolytes. The polymer is semipermeable and includes ionomeric units that conduct protons but is impermeable to gasses such as oxygen and hydrogen. An ionomer is a polymer whose monomeric units bear ionic (either cationic or anionic) groups, and their respective counter ions. The proton exchange polymer carries anionic sulfonate groups, and proton is their counter ion. The polymer may contain a backbone and side chains grafted to the backbone. The backbone may be fluorinated. The side chains may include pendant ionic groups, such as sulfonic acid groups, that promote proton-exchange. A pendant group is a functional group in either a main or side chain, and typically, the functional group is attached at the terminal position of a side chain. The proton-exchange polymer may be a sulfonated perfluoro-polymer (SPFP), such as fluorinated polyethylene-polypropylene or the like. In one embodiment, membrane matrix 102 may be formed from a SPFP material, where the polymer contains a perfluoroethylene polymer main chain. In a different embodiment, matrix 102 may include another proton-exchange membrane (PEM) material, such as Dow™ XUS-13114.10, where the membrane polymer contains a fluorinated-styrenic polymer main chain.

Suitable materials for forming matrix 102 include hydrocarbon-based aliphatic polymers that contain monomeric units bearing sulfonic acid pendant group, such as 3-sulfropopyl acrylate (SPA), 2-acrylamido-2-methyl propane-sulfonic acid (AMPS), 4-styrenesulfonic acid (SSA), and the like; and hydrocarbon-based aromatic polymers in which some of the backbone benzene rings bear sulfonic acid group, such as typical examples include polyimide (PI), polyphenyleneoxide (PPO), polysulfone (PSU), and polyetheretherketone (PEEK), and the like.

Acrylic composite membranes can be formed using some of the above mentioned materials according any suitable technique, such as the embedded polymerization technique disclosed in Pei, H. Q. et al, "Embedded polymerization driven asymmetric PEM for direct methanol fuel cells", *Journal Of Membrane Science*, 2006, vol. 270, no. 1-2, pp. 169-178, the contents of which are incorporated herein by reference; or the microemulsion polymerization technique disclosed in Gan, L. M. et al, "The zwitterion effect in proton exchange membranes as synthesised by polymerisation of bicontinuous microemulsions", *Chemical Communications*, 2005, vol. 35, pp. 4459-4461, the contents of which are incorporated herein by reference. The membrane matrix can be PI-based or PPO-based, as disclosed in Fang, J. et al., "Novel Sulfonated Polyimides as Polyelectrolytes for Fuel Cell Application. 1. Synthesis, Proton Conductivity, and Water Stability of Polyimides from 4,4'-Diaminodiphenyl Ether-2,2'-disulfonic Acid", *Macromolecules*, 2002, vol. 35, pp. 9022-9028; and Cho, C. G. et al., Preparation of Poly(phenylene oxide-gstyrenesulfonic acid) and their Characterization for DMFC Membrane", *High Performance Polymers*, 2006, vol. 18, pp. 579-591, the contents of each of which are incorporated herein by reference.

Composite 100 is also doped with particles 104 distributed in matrix 102. Particles 104 are ionomer particles that have an outer oligomeric ionomer, such as in their outer layers. The oligomeric ionomer interacts with the proton-exchange polymer in matrix 102 for attracting ionic groups in the side chains of the proton-exchange polymer. The interaction between the oligomeric ionomer and the polymer can cause a hydrophilic pool to form around the particles, which facilitates the retention of water and transport of protons.

An oligomeric molecule is of intermediate relative molecular mass. Its structure has a limited number of monomeric units derived, actually or conceptually, from molecules of lower relative molecular mass. An oligomeric molecule may be a polymer with short side chains. For example, an oligomeric molecule may have side chains each having, on average, less than 11 repeating units, such as 7 to 10 repeating monomeric units. The molar mass of an oligomeric molecule may be in the range of a few thousand amu. Suitable oligomeric ionomers may have a molar mass below 5,000 amu. The suitable molar mass may vary depending on the physical properties of the particular oligomeric molecules selected and the chemical structure of its monomeric units. A suitable oligomeric ionomer may have a linear chain of repeating monomeric units, where each repeating unit bears a functional group or may form a short side molecular segment, as will be discussed below.

It has been found that an oligomeric ionomer is advantageous over large polymeric ionomers that have relatively long side chains, as particles with outer oligomeric ionomer can be more uniformly distributed in the host matrix and are less likely to aggregate to form large sized particles.

The oligomeric ionomer should be selected so that it will not cause severe steric disturbance in matrix 102. Typically, such steric disturbance can be avoided if the oligomeric ionomer molecule is a dense and short molecular chain, such as having around ten repeating monomer units. The oligomeric chains should also be highly hydrophilic and proton conductive. Thus, monomer units that have a sulfonic acid group are good candidates for forming the oligomeric ionomer. In comparison, monomer units that have aromatic rings or a large hydrocarbon moiety are not suitable for forming the oligomeric ionomer. As can be understood by persons skilled in the art, organic amine group should also be avoided as it would trap protons. Further, the particle sizes should be sufficiently small to minimize disturbance to the membrane matrix. Smaller sizes also facilitate uniform distribution of the particles in the matrix, as will be discussed below.

Figure 2A:
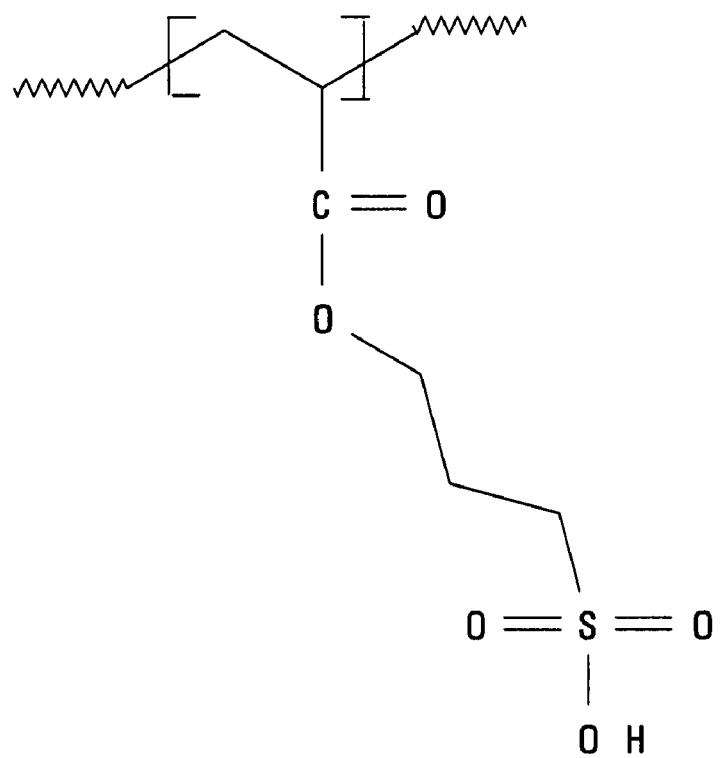
FIGS. 2A and 2B show schematically chemical structures of exemplary oligomeric ionomers that may be included in the particles of FIG. 1.

A suitable oligomeric ionomer may contain a pendant hydrophilic group or sulfonic acid group, such as a sulfopropyl ($-SO_3H$) group. In one embodiment, the oligomeric ionomer is formed of sulfopropyl acrylate (SPA) repeating units, $H_2C=CHCO_2(CH_2)_3SO_3H$, and is denoted as poly (SPA) or PSPA herein. FIG. 2A shows schematically a partial chemical structure of PSPA.

Figure 2B:
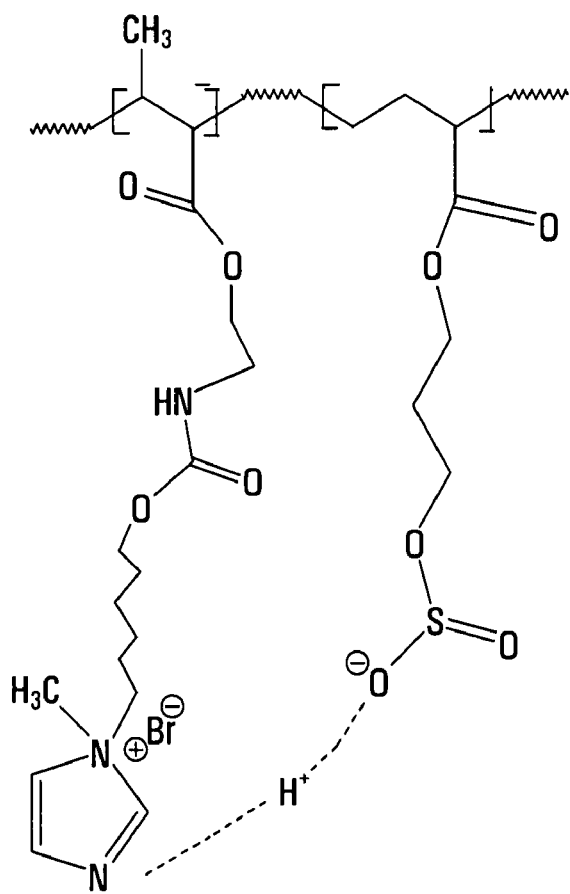

In another embodiment, the oligomeric ionomer is formed of a copolymer repeating unit, which is a copolymer of SPA and N,N'-methyl-(6-hexylcarbamatoethylmethacrylate) imidazolonium bromide (EMACI), denoted as poly(SPA-co-EMACI) herein. FIG. 2B shows schematically a partial chemical structure of Poly(SPA-co-EMACI).

As can be appreciated, the terminal imidazole group in EMACI has a weak Lewis basicity and can server as a proton sweeper, thus improving the proton conduction in composite 100. Tests results suggest that the quaternary imidazole group can perform the proton sweeping function in the presence of adjacent or adjoining sulfonic acid group. The imidazolonium group in EMACI has been found to facilitate proton transportation. It can also be expected that, in general, other nitrogen heterocyclic compounds that contain a quaternary nitrogen group ($N^+R_4X^-$) should also have similar functionality. Thus, the imidazolonium group shown in FIG. 2B may be replaced with another similar group, such as a triazolonium group or a different imidazolonium group, as can be appreciated by those skilled in the art.

Particles 104 in composite 100 have an average particle size of less than 20 nm. Particles 104 may have similar or different general shapes or sizes. For a given application, particles 104 may have generally uniform sizes and shapes, or their shapes and sizes may vary. For example, particles 104 may have an average particle size of about 10 nm, or below 10 nm. When particles 104 have an average size of about 10 nm, the actual particle sizes may be in the range from 7 to 15 nm. The tolerable range of variations may be determined by those skilled in the art in a given application.

In some embodiments, composite 100 may have an approximate volume fraction of particles 104 in the range from 15 vol. % to 28 vol. %, or correspondingly, a weight percentage in the range from 2 wt. % to 6 wt. %. Particles 104 may be uniformly distributed throughout matrix 102. However, as can be understood, absolutely uniform distribution is not necessary and may not be practical. Particles are considered uniformly distributed even when there is variation in their local densities measured in small volumes, as long as the densities in large volumes are substantially constant throughout the composite. A volume is considered large if it is greater than 1 micron$^3$.

Advantageously, the oligomeric ionomer in particles 104 can facilitate uniform distribution of the particles in a polymer matrix during formation, as particles 104 can be fully swelled by the solvent in a solution of proton exchange polymer, and can quickly diffuse around and become dispersed throughout the solution with high homogeneity.

Composite 100 may contain from 2 to 6 wt %, such as about 4 wt %, of particles 104. The concentration of particles 104 in composite 100 may vary within a tolerable range. For example, for concentration of about 4 wt %, the actual concentration may vary from 3 to 5 or 2 to 6 wt %, depending on the particular application. The concentration of particles 104 in composite 100 may be selected depending on the particular application. For example, composite 100 may contain an amount of particles 104 that is effective to reduce the permeability of a given liquid in composite 100, when such reduction is desired, as will become clear below. It has been shown that permeability of a liquid such as water or methanol in a PEM can be reduced by doping the PEM with 2 to 6 wt % of particles 104, as will be discussed further below.

Figure 3:
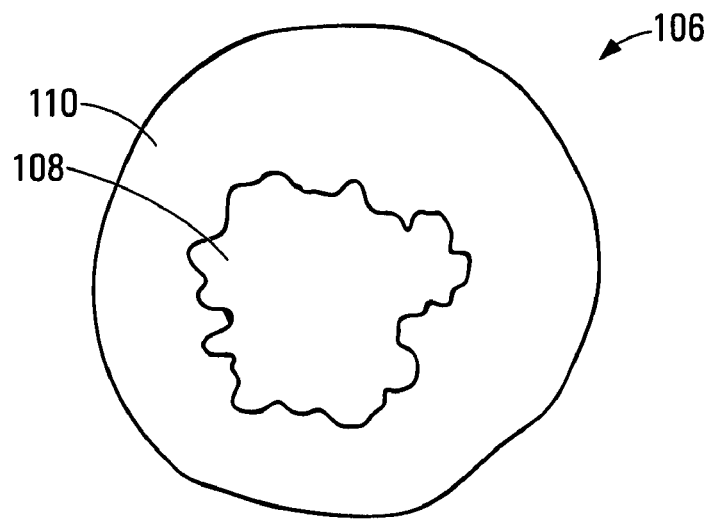
FIG. 3 is a schematic cross-sectional view of an ionomer particle, exemplary of an embodiment of the ionomer particles of FIG. 1.

FIG. 3 shows schematically a particle 106, representative of the morphology of an exemplary embodiment of particles 104. For ease of reference, particles like particle 106 are referred to as particles 106 collectively below. Particle 106 has an inner core 108 and an outer layer 110. The shapes and structures of core 108 and outer layer 110 may vary from those depicted in FIG. 3.

In one embodiment, particle 106 may have a particle size of about 10 nm. In another embodiment, particle 106 may have a particle size from 7 nm to 10 nm, or less than 10 nm. The particle sizes should be less than 20 nm to ensure uniform distribution and to limit disturbance to the membrane matrix. Core 108 may have a core size of about 7 nm, or less than 7 nm. In some applications, smaller core and particle sizes may be advantageous.

For a spherical core or particle, its size refers to its diameter. For a non-spherical core or particle, its size refers to its equivalent diameter. An equivalent diameter is the diameter of the sphere that has the same volume as that of the non-spherical core or particle. The particle or core size may be measured directly or indirectly such as from images of the particles. For example, the particle or core sizes may be determined from scanning electronic microscopic (SEM) images, transmission electron microscopic (TEM) images, or the like.

Core 108 is formed from fumed silica ($SiO_2$) and may also contain other substances such as inorganic acids as the additives to promote proton concentration. The additives may include $ZrO_2$, $WO_3$, $La_2O_3$, a combination thereof, or the like. Core 108 may be formed according to a conventional sol-gel technique using $SiCl_4$ or $Si(OEt)_4$ as the starting compounds, such as flame oxidation. Suitable fumed silica particulates or powders are commercially available, such as from Aldrich™ (e.g. product numbers S5130, 5380), Cabot™ Corporation (product name Cab-o-Sil™), or Degussa™ (product name Aerosil™).

Silica, such as fumed silica, is advantageous as the core material because many organic segments can be readily attached to silica through covalent bonds formed via a reaction known as silanization.

Layer 110 contains the oligomeric ionomer, which is bonded (grafted) to core 108.

Figure 4:
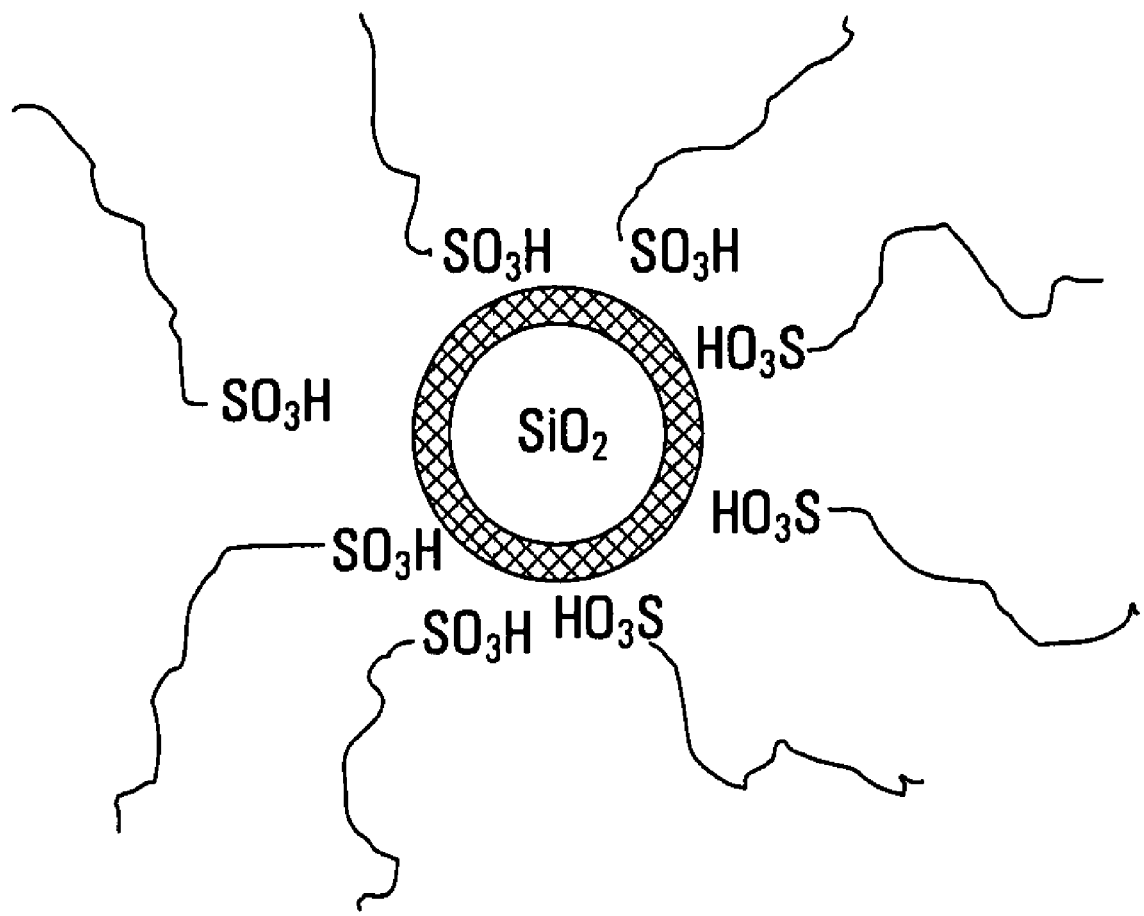
FIG. 4 is a schematic diagram illustrating the interaction between the ionomer particle of FIG. 3 and the side chains of a matrix polymer.

In an embodiment of layer 110, the oligomeric ionomer may be PSPA (see FIG. 2A) where the pendant group is the sulfopropyl group. As can be appreciated the sulfopropyl group is anionic. The anionic sulfopropyl group can attract the terminal groups of the side chains in the matrix polymer, as schematically illustrated in FIG. 4. In this embodiment, test results show that a particle concentration of 5 to 6 wt % in the composite may be optimal for some applications.

In another embodiment of layer 110, the oligomeric ionomer may be the copolymer poly(SPA-co-EMACI) (see FIG. 2B). Test results show that proton conduction in a Nafion membrane doped with particles that contain poly(SPA-co-EMACI) would peak at about 4 wt % of particle concentration. A lower concentration, such as 2 wt %, resulted in lower proton conduction. A higher concentration did not result in further increase in proton conduction.

Composite 100 has many possible applications. It has been discovered that composite 100 can have improved performance and properties over a conventional PEM such as a Nafion or a SPFP PEM. One of the improvements is increased fuel cell operation temperature range, which will be discussed further below. When composite 100 is in the form of a composite PEM, the permeability of methanol and the loss of matrix humidity in the composite PEM can be significantly reduced, as compared to a PEM that contains the same membrane matrix 102 but does not contain particles 104. Thus, the composite membrane can be advantageously used in a Hydrogen-FC at temperatures up to 80° C., or in a DMFC.

Particles 104 in composite 100 can enhance the proton-conductivity in composite 100 at high temperatures, and can prevent permeation of methanol or the like. Further, water retention at higher temperatures is improved. As a result, when composite 100 is used as the proton-exchange membrane in fuel cells, such as in a single fuel cell driven by $H_2$ or methanol, improved electrochemical performances, such as increased cell voltage at higher current density, and power output, can be achieved, as compared to a conventional SPFP PEM.

A PEM doped with particles 104/106 can also be advantageous over a PEM doped with pristine silica particles in some applications. For example, as compared to the latter, the former can have a more uniform particle distribution and a much less extent of particle aggregation in the matrix, all of which can result in improved performance. Tests, showed that the incorporation of pristine fumed silica into SPFP PEM matrix caused a drop of proton conductivity by about 5% due to heavy agglomeration of silica particles. In comparison, test results show that the proton conductivity at 80° C. increased by up to 37% when pristine silica particles (at 2 wt % loading) were replaced with PSPA-silica particles (see further details below). The grafted oligomeric ionomer layer can also improve the compatibility of the particles with the hosting membrane polymer, as compared to pure silica particles.

As now can be appreciated, in alternative embodiments, the core 108 of particle 106 may be formed of a different material other than silica. For example, carbon black (in the form of amorphous nanoparticles) or polymeric dendrimers may be used instead of silica. Whatever the material, the precursor particles for the core should have a suitable particle size (such as in the range of less than 10 nm) and should be suitable for bonding the oligomeric ionomer to the core, such as using the techniques discussed below.

Composite 100 and particles 104/106 may be prepared according to the methods discussed next, exemplary of embodiments of the present invention.

In a method exemplary of an embodiment of the present invention, composite 100 is formed as follows.

Particles 104 (e.g. particles 106) are dispersed in a solution to form a suspension mixture which has a homogeneous appearance, where the solution contains the proton-exchange polymer, such as SPFP, dissolved in a solvent. The polymer material such as SPFP may be obtained from a commercial source and may be initially in the form of resins. The solvent may include water, ethanol, N,N-dimethylformamide (DMF), dimethylsulfone (DMSO), N,N-dimethylacetamide (DMAC), or a combination thereof. The solution may include 5 to 10 wt % of the proton-exchange polymer. The amount of particles 104 in the solution may be adjusted such that they are 2 to 6 wt %, such as 4 wt % or 5 to 6 wt %, of the proton-exchange polymer. The solvent is then removed from the mixture. The residue of the mixture is cured in a mold that has the desired shape and size for the final product. The cured product forms composite 100 and has a shape and size that is determined by the mold.

Composite 100 may also be formed in any other suitable method as can be understood by one skilled in the art.

In a method exemplary of an embodiment of the invention, particles 104 such as particles 106 may be prepared from precursor particles, as described below.

Figure 5A:
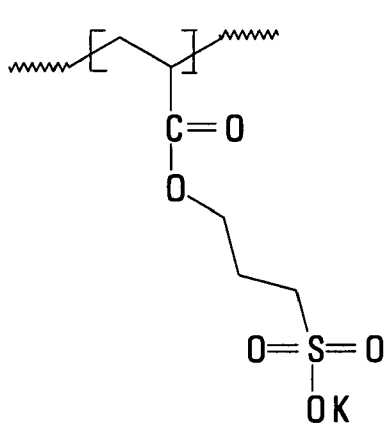
FIGS. 5A and 5B show schematically respective chemical structures of the salt forms of the oligomeric ionomers of FIGS. 2A and 2B, and FIGS. 5C and 5D show schematically respective chemical structures of the monomers for forming the salt forms of the oligomeric ionomers of FIGS. 5A and 5B.
Figure 5B:
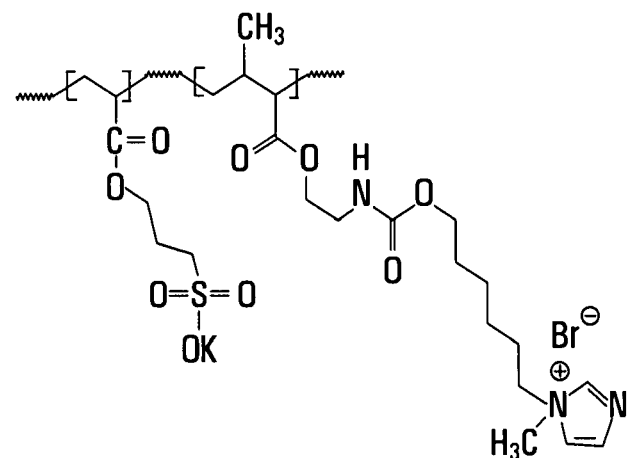

The precursor particles include silica particulates and a salt form of the oligomeric ionomer which is bonded to the silica particulates. A suitable salt form of PSPA is poly(3-sulfopropyl acrylate) potassium (PSPA-K), as schematically shown in FIG. 5A. Another suitable salt of SPA such as PSPA-Na may also be used. A suitable salt of poly(SPA-co-EMACI) contains repeating units of SPA-K and EMACI, as schematically shown in FIG. 5B.

Figure 5C:
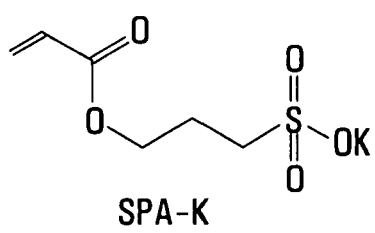
Figure 5D:
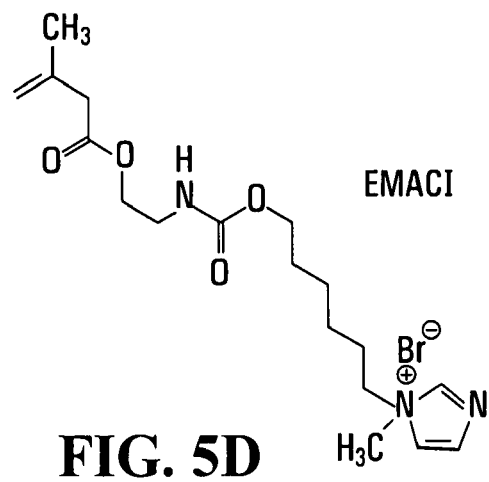

The precursor particles may be formed using precursor monomers such as monomers SPA-K and EMACI, which are illustrated in FIGS. 5C and 5D, respectively. The monomers may be arranged in a random manner (i.e. each SPA-K or EMACI repeating unit is linked to the chain individually) or in a block manner (i.e. a block of SPA-K units and a block of EMACI units are linked together).

Initially attaching the salt form (e.g. PSPA-K), rather than the acid form (e.g. PSPA-H), of the oligomeric ionomer to the silica core has the advantage that the basic oligomeric ionomer structure can be formed using the atom transfer radical polymerization (ATRP) technique, which will be further discussed below. As can be appreciated, SPA-K can be polymerized using ATRP, but SPA-H cannot. Using the ATRP technique can be advantageous as a dense oligomeric ionomer outer layer can be formed on silica cores using this technique. Another advantage of using SPA-K as the precursor monomer is that it is readily available from commercial sources.

Figure 6:
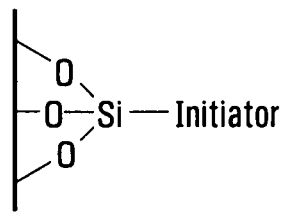
FIG. 6 is a schematic diagram illustrating the bonding of an initiator to a silanized silica particulate.

The precursor particles, such as (PSPA-K)-silica particles, may be prepared in any suitable manner. In an exemplary procedure, an initiator is first bonded to silica particulates, as illustrated in FIG. 6; and a salt form of the oligomeric precursor oligomer is then formed on the silica particulates by ATRP initiated by the initiator.

ATRP is a known polymerization process, which can be readily understood and performed by persons skilled in the art. An advantage of ATRP is that the extent of polymerization can be controlled and side reactions can be reduced or eliminated. In a typical ATRP, both an initiator and a catalyst are used. As can be understood, in ATRP the polymer chains can grow steadily and evenly at all the initiating centers and have well-defined pendant groups.

Figure 7A:
FIGS. 7A to 7D show chemical formulae of exemplary initiators.
Figure 7B:
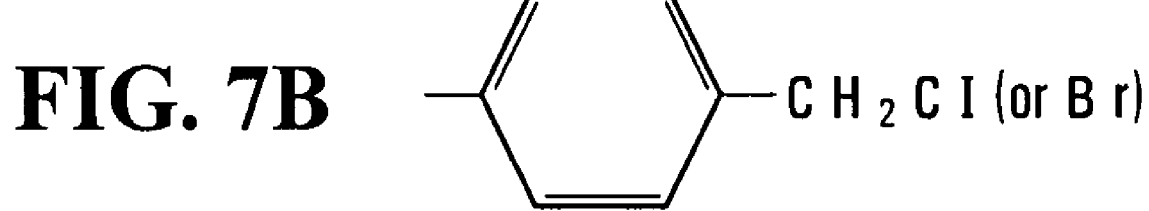
Figure 7C:
Figure 7D:
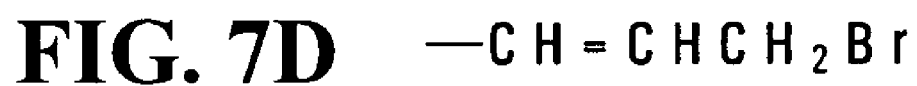

While conventional ATRP technique may be used, in an embodiment of the present invention, an improved ATRP technique is used, where the initiator for the ATRP is a 1,2-dibromoalkyl group such as a dibromoethyl group, as schematically illustrated in FIG. 7A. While other suitable initiators for ATRP, such as benzyl chloride (or bromide) (see FIG. 7B), a-bromoacetate (see FIG. 7C), allyl bromide (see FIG. 7D), or the like, may be used, the 1,2-dibromoalkyl group may be advantageous over the conventional initiators. For example, the bromoalkyl group may be advantageous in applications where particle aggregation is of concern. It has been found that when the 1,2-dibromoalkyl group is used as the initiator, the resulting particle sizes can be limited to relatively smaller sizes due to reduced aggregation of particles. This is because the polymerization (or chain growth) could take place at all the initiating sites over the surface of a single particle. It has also been found that when 1,2-dibromoalkyl group is used as the initiator, the resulting polymer or oligomer has a limited number of repeating monomer units, such as from 7 to 10 repeating units. In addition, it has been found that the use of a 1,2-bromoalkyl group as the initiator can increase the number of oligomer molecules grafted to the silica core. Without being limited to a particular theory, this result is believed to be due to two factors. First, two neighboring C—Br bonds in the 1,2-dibromoalkyl group polarizes each other, which is a unique feature. In other initiators, a C—Br bond is conjugated with a neighboring π-bond system. Hence, the 1,2-dibromoalkyl group is likely to have a greater initiation rate than the other initiators. Second, with 1,2-dibromoalkyl groups, two propagating chains can grow from a single initiating site as it has two adjacent C—Br bonds.

Figure 8:
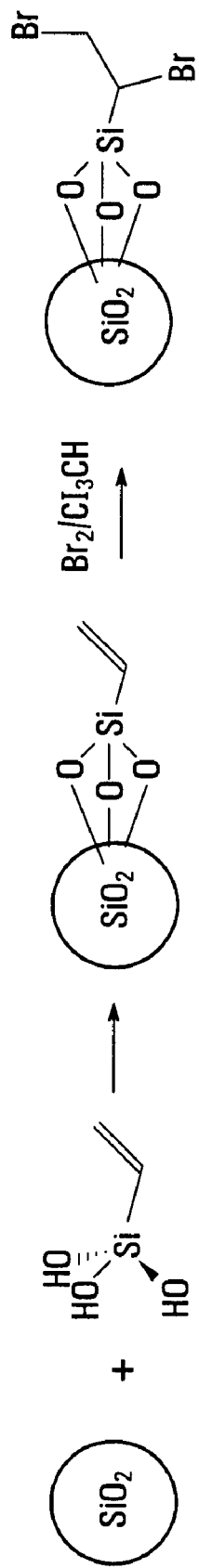
FIG. 8 is a schematic diagram illustrating a chemical reaction process for forming initiator-grafted silica particles.

An exemplary process of immobilizing the 1,2-dibromoalkyl group on the silica particles is illustrated in FIG. 8. As shown, the surfaces of the silica particulates are first silanized. As shown at the left-hand side in FIG. 8, silanization may be performed by bonding a vinyl group to the silica surface. The vinyl group may be triethoxyvinylsilicane (TEVS), alternatively known as triethoxyvinylsilane. This vinyl group may have a generic structure of $(EtO_3)_3Si$—R or $(MeO_3)_3Si$—R, where R contains an olefin group. Thus, TEVS may be replaced by 3-(Trimethoxysilyl)propyl acrylate $[H_2C=CHCO_2CCH_2)_3Si(OCH_3)_3$, TMSPA], which is commercially available. Silanization may be facilitated with a catalyst such as triethyl amine ($Et_3N$). The vinyl group bonded to the silica particulates are then reacted with bromine, such as in chloroform, to form a 1,-2-dibromo-ethyl group bonded to the silica surface, as shown on the far end of the right-hand side in FIG. 8. In different embodiments, chloroform may be replaced with another suitable solvent, such as carbon tetrachloride, dichrolomethane, carbon disulfide, or the like.

Figure 9:
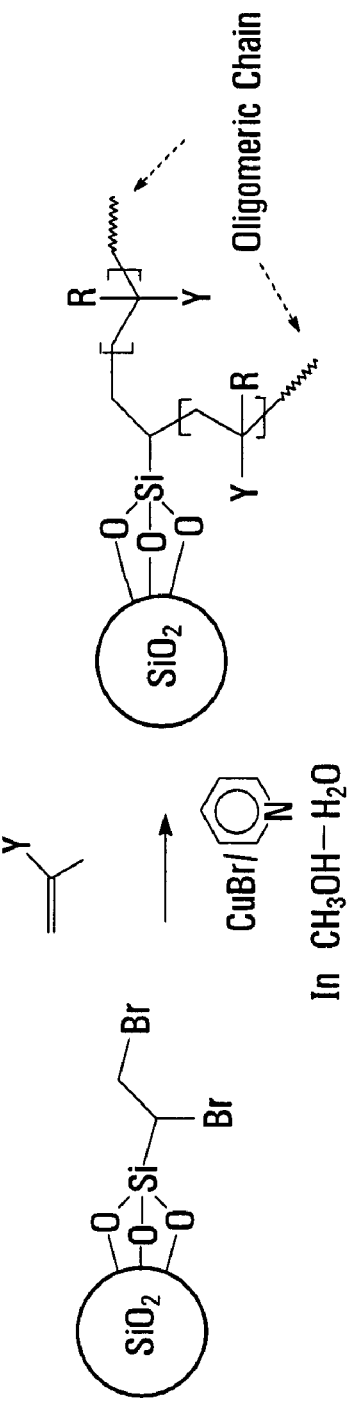
FIG. 9 is a schematic diagram illustrating an exemplary ATRP process for forming precursor particles from the initiator-grafted silica particles of FIG. 8.

The initiator-grafted silica particles are next subject to ATRP, as illustrated in FIG. 9. For example, as shown in FIG. 9, a precursor monomer for the desired resulting oligomeric ionomer, such as SPA-K, or a mixture of SPA-K and EMACI, may be mixed with the initiator-grafted silica particles in a solution, such as a water-methanol mixture, for them to react with each other. In FIG. 9, "Y" may be SPA-K or EMACI, and "R" may be H or $CH_3$ depending on Y (see e.g. FIGS. 5A and 5B). The mixture may be stirred and heated, and a suitable catalyst, such as CuBr(Pyrindie) or bi-pyridine (bPy), may be added, to promote the polymerization reaction. A suitable amount of copper(I) bromide may also be added to the mixture. The ATRP of the precursor monomer is initiated by the initiator, the 1,-2-dibromo-ethyl group. As a result, the polymerized precursor ionomer is grafted, i.e., bonded, to the silica particulates or cores.

The resulting particles, such as PSPA-K-silica, can be used as the precursor particles for reacting with an acid to form particles 106, such as by soaking the precursor particles in the acid.

The acid used to treat the precursor particles may be a dilute sulfuric acid (1M). Other mineral acids, such as hydrochloric acid and nitric acid, are not suitable because HCl contraindication in the PEM will cause negative effect on fuel cell performance and $HNO_3$ has a strong oxidative capability.

In one embodiment, the precursor particles may be mixed with, such as soaked in, an aqueous solution of the acid to form a mixture. The solution may include about 5.5 vol % of the sulfuric acid. The mixture may be stirred at room temperature for a given period, such as 6 hours. During this time, ion-exchange occurs and the salt form of the ionomer is gradually converted to the acid form of the ionomer. Stirring may be terminated when the ion-exchange between SPA-K units and $H_2SO_4$ in the solution has reached equilibrium. Whether equilibrium is reached may be determined by titrating the sulfuric solution using a standard NaOH solution. At equilibrium, the salt form of the oligomeric ionomer (e.g. PSPA-K) is mostly converted to the acid form (e.g. PSPA-H). The stirred mixture may be washed with deionized water and centrifuged in a centrifugation tube, such as at 6,000 rpm for 15 minutes. The particles are then separated from sulfuric acid and other impurities. Washing may be repeated twice or more times in the centrifugation tube to ensure sufficient or complete removal of the acid and other impurities. The residues in the mixture, i.e., the reactant particles, contain particles 104, or more specifically, particles 106.

Advantageously, the oligomeric ionomer in the particles formed according to the above methods has an intermediate relative molecular mass and a limited number of repeating units, typically less than 11.

As now can be appreciated, the particles formed according to the above described methods can also be used in other proton-exchange materials, such as proton-exchange resins, in addition to as a dopant in PEMs.

Modifications or variations to the embodiments described above may be possible, depending on the particular requirements or circumstances in different applications, where one or more of the required proton conductivity, water and methanol permeability, mechanical strength, or thermal stability may vary.

As particles 104/106 may have a soft outer layer and a small size, each of them may be able to fit into one of the proton conducting channels of a PEM matrix, which are about 5 to 20 nm in width, rather than cut across multiple channels. In comparison, harder particles with a width much larger than the width of proton conducting channels are likely cut through multiple channels, causing a merge of proton conducting channels and hence a decrease in the channel density in the matrix.

EXAMPLES

Fumed silica powder (average particle size about 7 nm), TEVS, $Et_3N$, bromine copper(I) bromide, SPA-K, bi-pyridine (bPy), and SPFP resin or Nafion™-117 (from Aldrich™) were obtained from commercial sources and were used as received for preparing the samples as described below.

Cationic monomer EMACI was prepared as follows. 6-Bromo-1-hexanol and 2-isocynatoethyl methacrylate, with a molar ratio of 1:1, were mixed in tetrahydrofuran (THF). A catalyst, dibutyldilauriate tin (DDT), in the amount of about 3 wt % of the isocynatoethyl methacrylate, was also added to the mixture. The mixture was stirred at room temperature for 12 hours. The resulting mixture was mixed with 1-methylimidazole, at molar ratio of 1:1, in ethanol, and was subjected to quaternization in nitrogen gas at 40° C. for 24 hours. The resulting product was cationic monomer EMACI (see FIG. 5D).

Vinyl-silica powders were prepared as follows. 500 mg of fumed silica power and 1 ml of TEVS were added to 50 ml of toluene. 0.15 ml of $Et_3N$ was also added as the catalyst. The resulting mixture was stirred at room temperature in argon gas for 24 hours. The reaction proceeds as illustrated in the first reaction step of FIG. 8. The surfaces of the silica particulates were silanized by TEVS and vinyl-silica particles or powders were formed. The vinyl-silica particles had the structure illustrated in the middle of FIG. 8. The mixture was then centrifuged at 8,000 rpm for 15 minutes to collect the vinyl-silica powder in the form of wet slurry. The slurry was washed with THF several times to remove any excess TEVS. After each wash, the slurry was dispersed in fresh THF and centrifuged to recollect the powder slurry. The washed slurry was dried at 60° C. in a vacuum oven for 72 hours to obtain dry vinyl-silica powders.

Sample I (Initiator-Grafted-Silica Powder)

Sample I was prepared as follows. The dry vinyl-silica powders were mixed with about 5 ml chloroform in a flask. The resulting mixture was stirred and a chloroform solution containing about 19.5 mmol of bromine was slowly added to the mixture at a temperature between 0 to 5° C. The mixture was continuously stirred for about 30 minutes, after which a powder containing 1,2-dibromoethyl-silica particles was formed (see FIG. 4). The initiator-grafted-silica powder was purified by washing with pure chloroform for three times.

Sample II ((PSPA-K)-Silica Particles)

Sample II was prepared as follows. 0.15 g of Sample I was dispersed in 12 ml of a water-methanol mixture. The volume ratio of water to methanol was 3:1. The dispersion of the powder was promoted with ultrasonic mixing. SPA-K monomer and a catalyst-ligand, bPy, were then added into the resulting mixture. The mixture was degassed by purging nitrogen therethrough for 30 minutes. During purging, the mixture was continuously stirred at a temperature of from 35 to 40° C. 0.06 g of Copper (I) bromide was added next after removing oxygen by N2 purging. The mixture was further stirred for 4 hours under the same condition. Polymerization of the monomer occurred during this time, in an ATRP process initiated by the dibromoethyl group (see FIG. 9). The polymerization was terminated by exposing the mixture to air. The mixture was then centrifuged in a centrifugation tube at a rate of 6,000 rpm for 15 minutes. The supernatant in the mixture after centrifugation was decanted out. The blue ATRP catalyst-contaminated sediment remaining in the centrifugation tube was washed out with distilled water, accompanied by ultrasonic agitation. The cycle of centrifugation-washing was repeated three times to obtain purified precursor particles where PSPA-K was grafted to the silica cores.

Sample III (PSPA-Silica Particles)

Sample III was prepared as follows. Sample II was mixed with an aqueous solution of sulfuric acid (30% concentration). The mixture was mildly stirred at room temperature for 6 hours to convert the salt form —$SO_3K$ to its acid form —$SO_3H$. The resulting powder contained particles having silica cores and PSPA grafted to the cores. The powder was washed with deionized water and centrifuged at 6,000 rpm for 15 minutes to separate the powder from the liquid phase. The washing was repeated three times to remove residual acid. The washed powder was finally subjected to vacuum drying. The dried powder contained PSPA-silica particles.

Sample IV (Poly(EMACI)-Silica Particles)

Sample IV was prepared according to the same procedure for Sample III with the exception that SPA monomer was replaced with EMACI monomer.

Sample V (Poly(SPA-co-EMACI)-Silica Particles)

Sample V was prepared according to the same procedure for Sample III except that SPA monomer was replaced with a mixture of SPA and EMACI monomers. While the molar ratio of SPA to EMACI was about one in the reaction mixture, test results showed that the molar ratio of SPA to EMACI in the resulting particles was about 5/4.

Samples VI to VIII (SPFP Membrane Doped with PSPA-Silica)

Different membrane samples were prepared by mixing different amounts of Sample III with 2 ml of SPFP solution. The SPFP solution was prepared by dissolving SPFP resins in a mixture of water, alcohol, and DMF. The SPFP content in the SPFP solution was fixed at 5 wt % for different samples as this concentration gives an appropriate viscosity for mixing with sample III and for membrane casting. For different samples, the amount of Sample III dispersed in the SPFP solution was adjusted such that the total weight of the PSPA-silica particles were 2, 4, or 6% of the dry weight of the SPFP, respectively.

For each sample membrane, the respective mixture of Sample III and SPFP solution was cast in a Petri dish (with a diameter of about 3 cm) and baked in an oven at 80° C. for 30 minutes to remove the solvent and cure the residue. The cured residue was washed with deionized water and dried at room temperature. The composite membrane articles thus formed were removed from the Petri dish.

The composites samples were doped with about 2, 4 or 6 wt % of PSPA-silica particles, which are referred to herein as Sample VI, VII or VIII respectively.

Samples IX and X (Nafion Membrane Doped with Sample III) and Samples XI and XII (Nafion Membrane Doped with Sample V)

Different samples were prepared by mixing different amounts of sample III or V in 3 ml of a Nafion-117™ solution. The solution contained 5 wt % of Nafion-117 membrane resins. The weight of Sample III or V was 2% or 4% of that of membrane resins, respectively. The mixture was cast in the Petri dish and heated at 80° C. for 30 minutes to form a composite membrane sample. After being soaked in water for a short period, the composite membrane sample was detached from the Petri dish and dried for a few hours at room temperature. The membrane samples were referred to herein as Samples IX (2%), X (4%), XI (2%), and XII (4%), respectively.

Sample XIII (Comparison Sample, Silica Particles)

Sample XIII was fumed silica particulates as obtained from a commercial source (Aldrich Co.).

Sample XIV (Comparison Sample, Nafion Membrane Doped with Silica)

Nafion-117 membrane doped with pristine silica particles was prepared in a similar procedure as for Samples IX and X. The concentration of silica particles in the membrane were about 4 wt %.

Sample XV (Comparison Sample, Pristine SPFP Membrane)

Pristine SPFP membrane was purchased from Shandong Dongyue Polymer Materials Co., Ltd.™

For convenient reference, the samples described above are listed in Table I.

TABLE I

| Sample | Type | Ionomer | Membrane |
|---|---|---|---|
| I | Initiator-silica particles | (n/a) | (n/a) |
| II | precursor particles | (SPA-K) | (n/a) |
| III | Ionomer-silica particles | SPA | (n/a) |
| IV | Ionomer-silica particles | EMACI | (n/a) |
| V | Ionomer-silica particles | SPA-co-EMACI | (n/a) |
| VI | Doped membrane | SPA, 2 wt % | SPFP |
| VII | Doped membrane | SPA, 4 wt % | SPFP |
| VIII | Doped membrane | SPA, 6 wt % | SPFP |
| IX | Doped membrane | SPA 2 wt % | Nafion-117 |
| X | Doped membrane | SPA 4 wt % | Nafion-117 |
| XI | Doped membrane | SPA-co-EMACI 2 wt % | Nafion-117 |
| XII | Doped membrane | SPA-co-EMACI 4 wt % | Nafion-117 |
| XIII | Silica particles | (pristine silica) | (n/a) |
| XIV | Doped membrane | (pristine silica, 4 wt %) | SPFP (Nafion-117) |
| XV | Pristine membrane | (n/a) | SPFP |

Figure 10A:
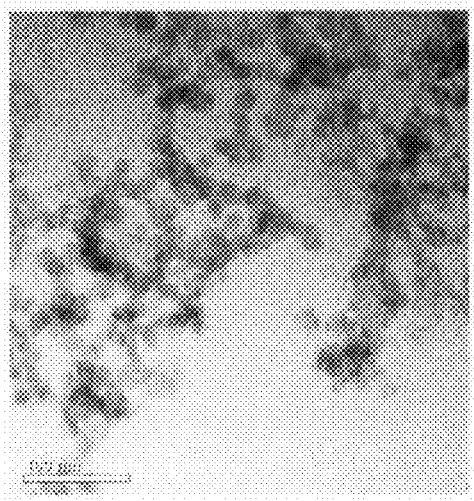
FIGS. 10A to 10C are transmission electron microscopic images of different sample particles, respectively.
Figure 10B:
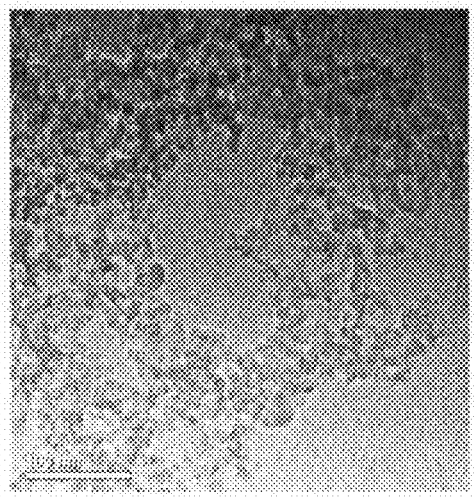
Figure 10C:
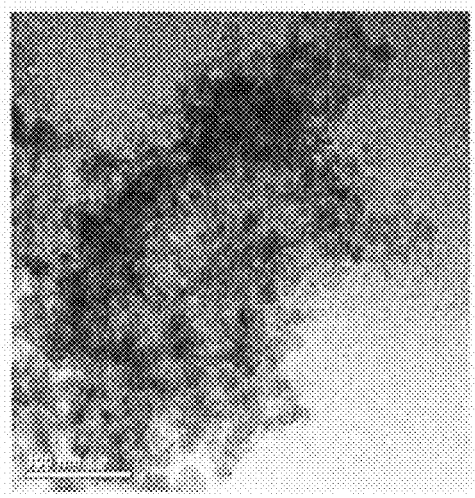

FIGS. 10A to 10C show, respectively, the TEM images of Samples XIII, II, and V in their respective dry forms. The comparison sample contained about 4 wt % of pristine silica particles. As compared to Sample XI, Sample II and Sample V particles were lightly aggregated. The average particle sizes in Sample II or V were about 10 nm.

Figure 11A:
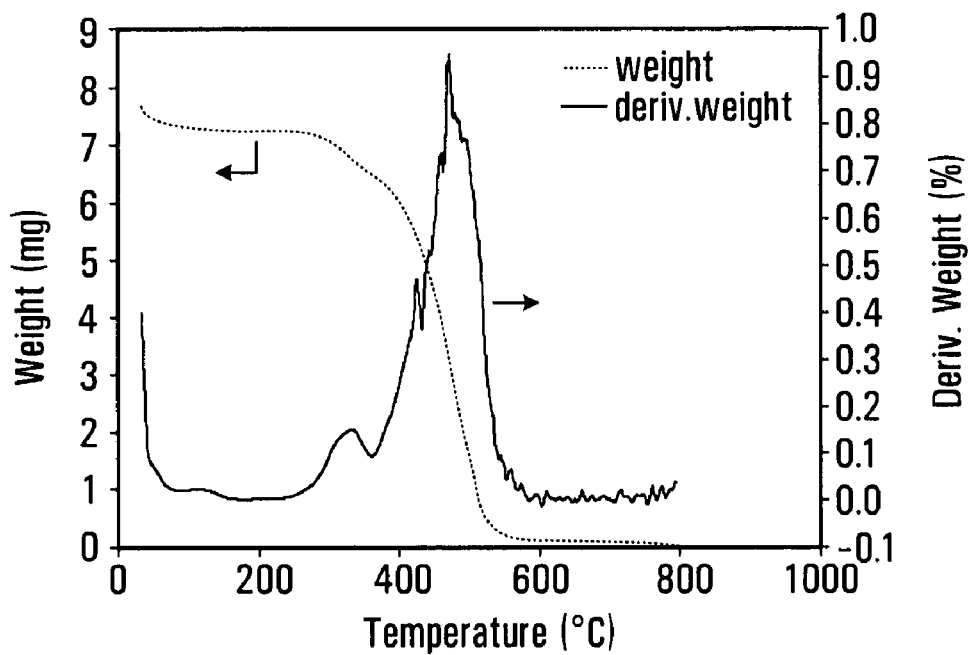
FIGS. 11A and 11B are line graphs showing the weight changes of different samples as a function of temperature.
Figure 11B:
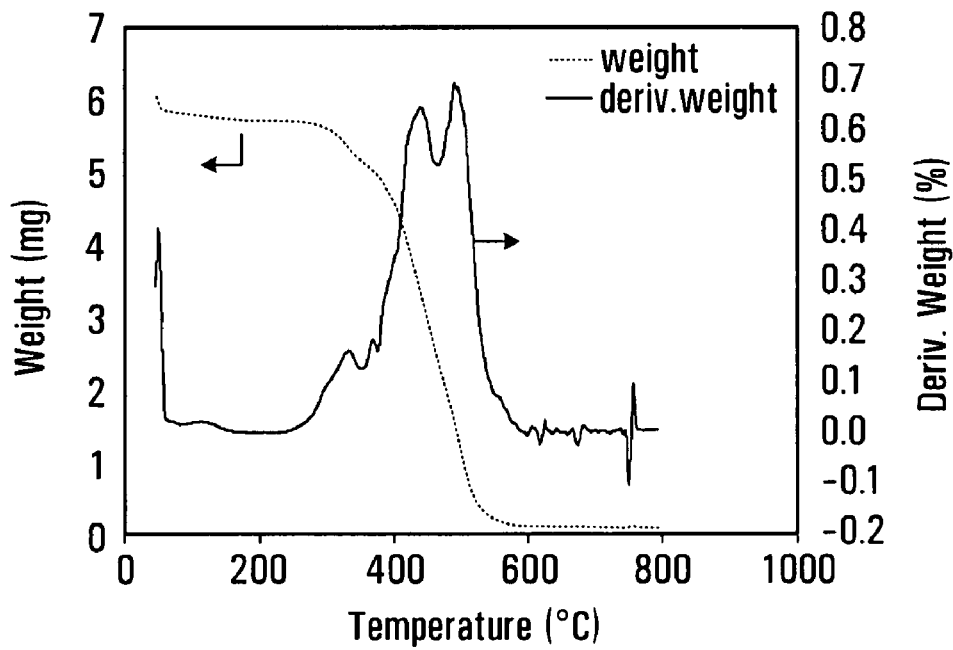

FIGS. 11A and 11B show thermogravimetric analysis (TGA) thermograms for Samples XV and VII, respectively. Each graph shows the change in membrane weight (both absolute weight change and percentage change) as a function of temperature. As can be inferred from the figures, Sample VII membrane retained more than 90% of its weight at temperatures up to about 300° C., showing good thermal stability. It is expected that the mass loss at lower temperatures was mainly due to evaporation of small solvent molecules such as water, methanol and ethanol. The mass loss in both sample membranes mainly occurred in the temperature range from 300 to 600° C. Both samples exhibited similar trend of mass loss. Thus, it can be inferred from the graph that the presence of a low content (4 wt %) of PSPA-silica particles in the SPFP matrix did not noticeably lower the thermal stability of the doped SPFP matrix.

Figure 12A:
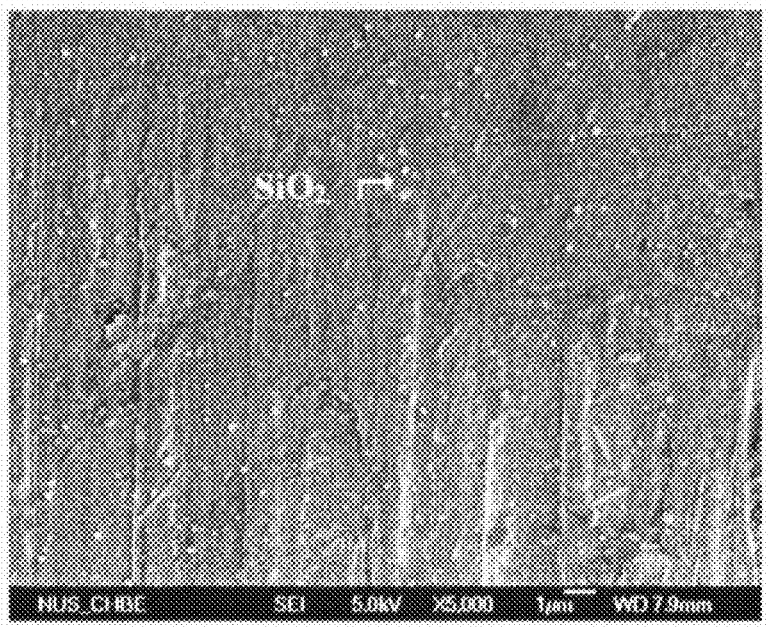
FIGS. 12A and 12B are field emission scanning electron microscopic images of different composite membrane samples.
Figure 12B:
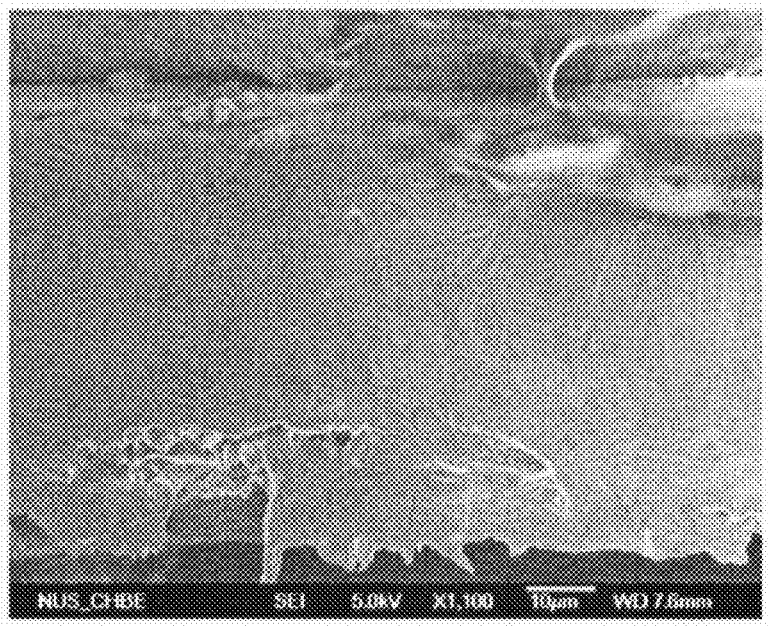

It has also been found that the PSPA ionomer grafted onto the silica cores facilitated uniform dispersion of the particles in the sample SPFP membrane matrix. In comparison, pristine nano-silica particles were observed to aggregate spontaneously in a SPFP matrix. The difference can be seen in FIGS. 12A and 12B. FIG. 12A shows a field emission scanning electron microscopic (FESEM) image of a cross-section of Sample XIII, where aggregation of the silica particles can be clearly seen (shown as white dots). The sizes of the silica particles were up to about 0.1 micron. FIG. 12B shows an FESEM image of a cross-section of Sample VIII, where no significant agglomerates were observable. Further, it was observed that the oligomeric ionomer grafted silica particles were uniformly distributed in the membrane matrix, as can be seen in FIG. 12B.

The proton conductivities of Samples VI, VII, XII, and XIII were measured at different temperatures on an electrochemical analyzer (Autolab™ Model), using the AC impedance spectroscopic method. The frequency scanning range was from 0.01 Hz to 1 MHz. The AC perturbation voltage was 10 mV and the DC rest voltage was 0.0V.

Figure 13:
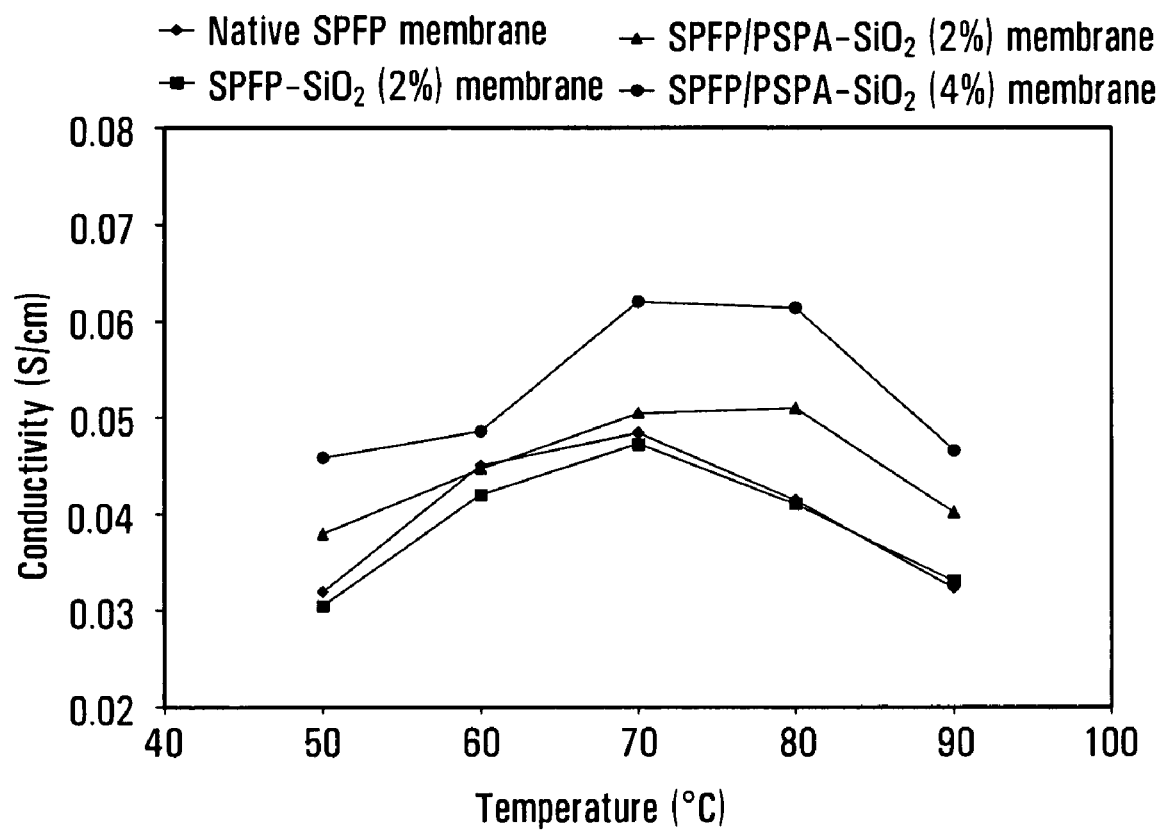
FIG. 13 is a line graph showing the change of proton conductivity over temperature for different membrane samples.

FIG. 13 shows measured proton conductivities at different temperatures for Samples VI, VII, XIII and XIV. The relative humidity was about 70% for all the measurements. From the graph, it can be concluded that proton conductivity was significantly enhanced in Sample VI and VII, more so in Sample VII than in Sample VI, as compared to the comparison Samples XIII and XIV. In contrast, the SPFP membrane doped with pristine silica particles (Sample XIV) had lower proton conductivity in the temperature range from 50 to 80° C., as compared to pure SPFP membrane (Sample XIII). This result shows that a relatively low loading (e.g. 2 to 4 wt %) of oligomeric ionomer grafted silica particles can significantly improve the proton conductivity of the resulting membrane. The improvement is more pronounced at temperatures higher than about 70° C. This result suggests that the oligomeric ionomer grafted to the silica also enhanced preservation of water in the matrix.

Proton conductivities were also measured in various hydrated and dehumidified samples, which are listed in Table II. The "hydrated" samples were soaked in deionized water until the sample was saturated with water, and the "dehumidified" samples were baked in a vacuum oven at 40° C. for two days.

TABLE II

Proton Conduction

| Sample | | Proton conductivity (S/cm) | |
|---|---|---|---|
| | | Hydrated | Dehumidified |
| VI | SPA (2 wt %) | 0.02 | 0.006 |
| XI | SPA-co-EMACI (2 wt %) | 0.02 | 0.013 |
| VII | SPA (4 wt %) | 0.022 | 0.007 |
| XII | SPA-co-EMACI (4 wt %) | 0.023 | 0.018 |
| XIII | Nafion-117 (by casting) | 0.012 | 0.0007 |

Without being limited to any theory, it is expected that the hydrophilic head groups (—$SO_3H$) of the perfluoro-oligomer ionomer will form nano-scale hydrophilic pools. The hydrophilic pool is formed because of a very high concentration of pendant sulfonic acid group in the grafted oligomeric ionomer layer, which has a much stronger capability to attract and store moisture, and to pass protons. As a result, proton migration through the membrane is accelerated, which in turn promote proton conductivity.

Figure 14A:
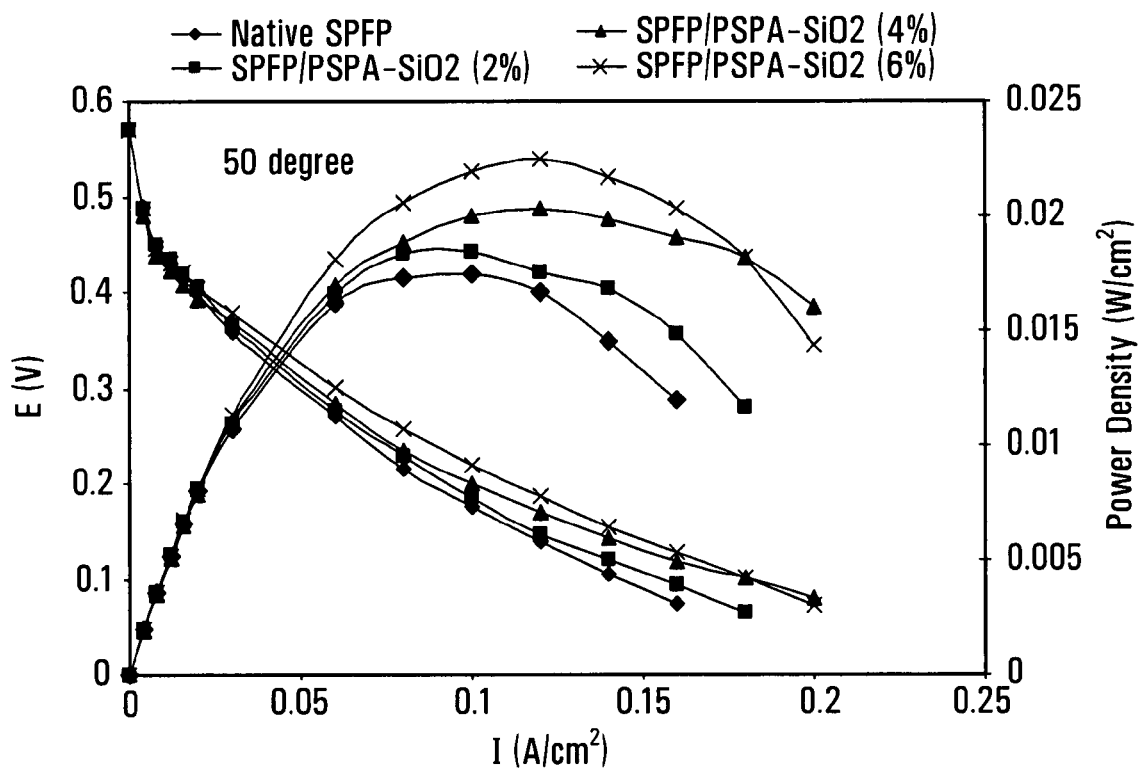
FIGS. 14A to 14D are line graphs showing the change of cell potential and power density over current at different temperatures for different membrane samples.
Figure 14B:
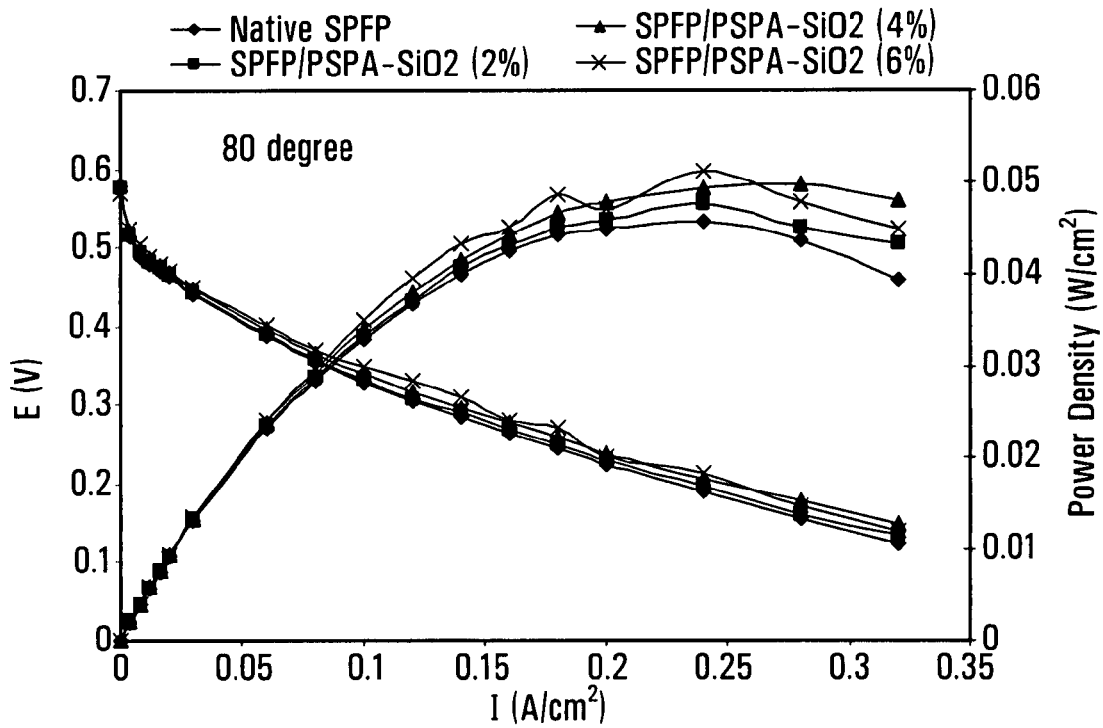

FIGS. 14A and 14B show the measured change of power density and cell voltage in different DMFCs where Samples VI, VII, VIII, and XIII were respectively used as the proton-exchange membrane, at temperatures of 50° C. and 80° C. respectively. As shown in FIG. 14A, at 50° C., the doped membranes, Samples VI to VIII, exhibited better performance than the un-doped membrane, Sample XIII. The higher the dopant concentration, the better the performance. At 6 wt % dopant level (Sample VIII), the maximum open circuit voltage (OCV) was 0.58 V and the maximum power density output was 22.4 mW/cm². As shown in FIG. 14B, at the operating temperature of 80° C., the same trend exists but the magnitude of the performance enhancement is not as high as at 50° C.

Figure 14C:
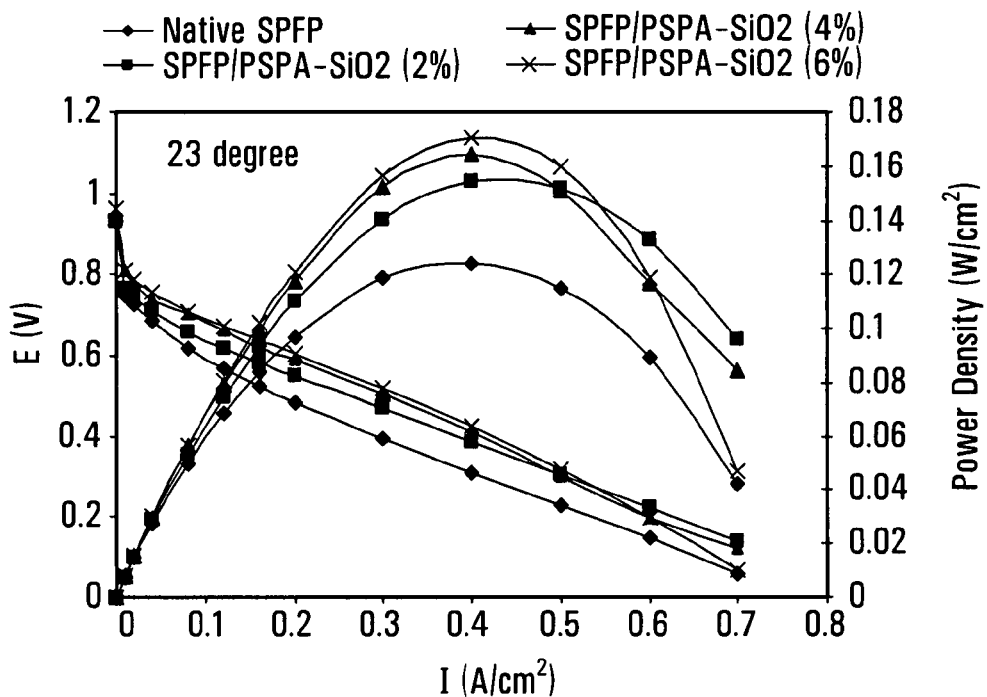
Figure 14D:
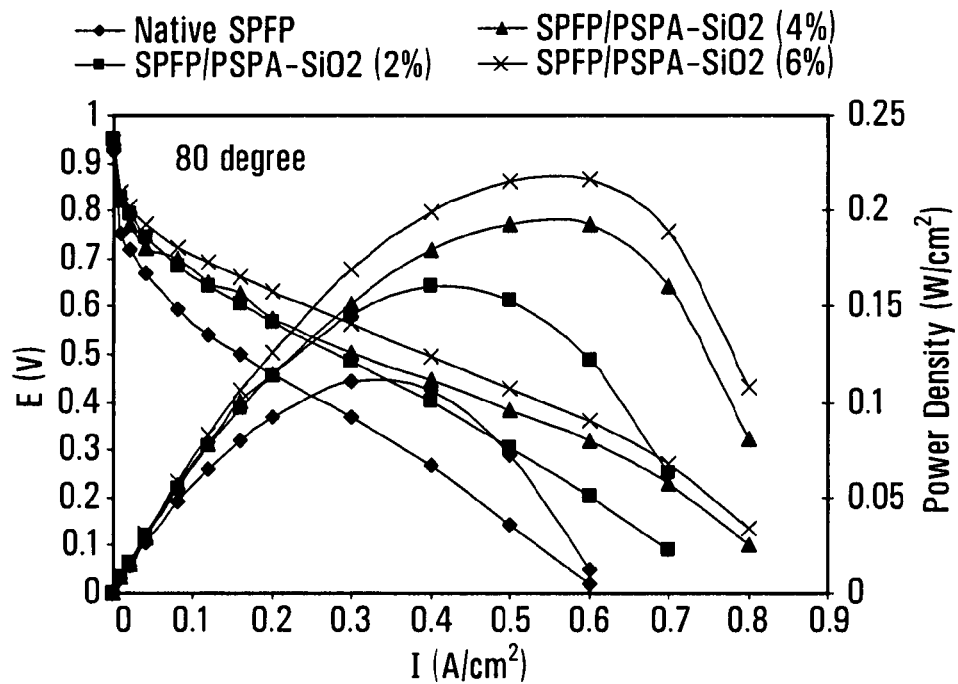

FIGS. 14C and 14D show similar graphs as in FIGS. 14A and 14B but for $H_2$—FCs operated at 23° C. and 80° C., respectively. It can be observed that the performance enhancement resulted from doping the SPFP membrane with PSPA-silica particles is more significant in the $H_2$—FCs than in the DMFCs. For example, Sample VIII gave rise to a maximal OCV of 0.96 V and maximal output power density of 196 mW/cm² at the ambient temperature. At 80° C., the performance enhancement over the un-doped membrane Sample XIII is even greater in the $H_2$—FCs, in comparison to the DMFCs.

Without being limited to any particular theory, it is expected that the observed performance enhancement results from increased proton flux and improved proton transport, which is in turn due to the presence of the oligomeric ionomer-grafted silica particles in the doped membrane. The increase in proton flux is likely due to the high density of pendant sulfonic acid groups provided by PSPA-silica particles. Better proton transport can be attributed to the hydrophilic interactions between PSPA-silica particles and the SPFP side chains, as illustrated in FIG. 4.

Test results also show that when used in a DMFC, an SPFP membrane doped with PSPA-silica particles has improved performance over pristine SPFP PEM in the temperature range from 40 to 50° C. (see e.g. FIGS. 14A and 14B). However, in the particular samples tested, at a high temperature such as 80° C., the improvement was insignificant.

Other features, benefits and advantages of the embodiments described herein not expressly mentioned above can be understood from this description and the drawings by those skilled in the art.

The contents of each reference cited above are hereby incorporated herein by reference.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A proton-exchange composite, comprising:
   a polymer matrix formed from a proton-exchange polymer having side chains, said side chains having ionic groups; and
   ionomer particles having an average particle size of less than 20 nm and comprising an oligomeric ionomer that interacts with said proton-exchange polymer and attracts said ionic groups, said ionomer particles distributed in said matrix.

2. The composite of claim 1, wherein said oligomeric ionomer has a pendant sulfopropyl group.

3. The composite of claim 2, wherein said oligomeric ionomer comprises a sulfopropyl acrylate (SPA) repeating unit.

4. The composite of claim 3, wherein said oligomeric ionomer comprises an N,N'-methyl-(6-hexylcarbamatoethyl-methacrylate) imidazolonium bromide (EMACI) repeating unit.

5. The composite of claim 1, wherein said oligomeric ionomer comprises less than 11 repeating units.

6. The composite of claim 1, wherein said ionomer particles comprise a silica core and an oligomeric ionomer bonded to said silica core.

7. The composite of claim 6, wherein said silica core has a core size of about 7 nm.

8. The composite of claim 1, wherein said ionomer particles have an average particle size less than 10 nm.

9. The composite of claim 1, wherein said proton-exchange polymer is a sulfonated perfluoro-polymer (SPFP).

10. The composite of claim 9, wherein said SPFP comprises fluorinated polyethylene-polypropylene.

11. The composite of claim 1, comprising from 2 to 6 wt % of said ionomer particles.

12. The composite of claim 1, comprising about 4 wt % of said ionomer particles.

13. The composite of claim 1, wherein said ionomer particles are uniformly distributed throughout said polymer matrix.

14. The composite of claim 1, in the form of a membrane or resin.

15. A method for forming the composite of claim 6, comprising:
   bonding an initiator to silica particulates;
   initiating, with said initiator, polymerization of a precursor monomer, to form a salt form of said oligomeric ionomer bonded to said silica particulates;
   reacting said salt form of said oligomeric ionomer with an acid to produce said oligomeric ionomer bonded to said silica particulates, and thus form said ionomer particles;
   dispersing said ionomer particles in a solution comprising a solvent and said proton-exchange polymer dissolved therein, to form a mixture;
   removing said solvent from said mixture, leaving a residue comprising said ionomer particles and said proton-exchange polymer; and
   curing said residue to form said composite.

16. The method of claim 15, wherein said initiator is a 1,2-dibromoalkyl group.

17. The method of claim 15, wherein said initiator is a dibromoethyl group.

18. The method of claim 15, wherein said bonding comprises:
   bonding a vinyl group to said silica particulates; and
   reacting said vinyl group with bromine to form a 1,-2-dibromo-ethyl group bonded to said silica particulates.

19. The method of claim 18, wherein said vinyl group is triethoxyvinylsilane.

20. The method of claim 15, wherein said precursor monomer comprises a salt of sulfopropyl acrylate (SPA).

21. The method of claim 20, wherein said salt of SPA is SPA-potassium (SPA-K).

22. The method of claim 20, wherein said precursor monomer comprises N,N'-methyl-(6-hexylcarbamatoethyl-methacrylate) imidazolonium bromide (EMACI).

23. The method of claim 15, wherein said solvent comprises water, ethanol, and dimethylformamide.

24. The method of claim 15, wherein said solution comprises 5 to 10 wt % of said proton-exchange polymer.

25. The method of claim 15, wherein said polymerization comprises atom transfer radical polymerization.

26. The method of claim 15, wherein said acid is a sulfuric acid.

* * * * *